United States Patent [19]

Jesse

[11] 4,041,297

[45] Aug. 9, 1977

[54] REAL-TIME MULTIPLIER WITH SELECTABLE NUMBER OF PRODUCT DIGITS

[76] Inventor: Harold V. Jesse, 11 Granite St., Cambridge, Mass. 02139

[21] Appl. No.: 614,143

[22] Filed: Sept. 17, 1975

Related U.S. Application Data

[63] Continuation of Ser. No. 530,225, Dec. 6, 1974, abandoned, which is a continuation of Ser. No. 380,991, July 19, 1973, abandoned, which is a continuation of Ser. No. 174,897, Aug. 24, 1971, abandoned.

[51] Int. Cl.² ............................................. G06F 7/52
[52] U.S. Cl. ....................................... 235/164; 235/160
[58] Field of Search ................. 235/156, 159, 160, 164

[56] References Cited

U.S. PATENT DOCUMENTS

| | | | |
|---|---|---|---|
| 3,407,290 | 10/1968 | Atrubin | 235/164 |
| 3,610,907 | 10/1971 | Taylor | 235/164 |
| 3,670,956 | 6/1972 | Calhoun | 235/164 |

*Primary Examiner*—David H. Malzahn
*Attorney, Agent, or Firm*—Martin M. Santa

[57] ABSTRACT

A real-time multiplier capable of providing any desired number of the most significant product digits is described. The multiplier and multiplicand are provided concurrently to the multiplier as serial digital numbers. The least significant product digit is provided as the first digit of the serial digits of the product. Undesired less significant product digits are suppressed within the multiplier and do not appear as product digits, thereby allowing the successive operands to be provided to the multiplier without the waiting period between operands which would otherwise be required to allow all product digits to be read out of the multiplier from the previous multiplication. The number of stages in the multiplier is equal to the maximum number of digits in the operand.

5 Claims, 5 Drawing Figures

REAL-TIME MULTIPLIER WITH SELECTABLE NUMBER OF PRODUCT DIGITS

This is a continuation, of application Ser. No. 530,225 filed Dec. 6, 1974, now abandoned, which was a continuation of application Ser. No. 380,991 filed July 19, 1973, now abandoned, which was a continuation of application Ser. No. 174,897, filed August 24, 1971, now abandoned.

This invention relates to an apparatus and method for performing real-time multiplication of digital numbers and providing only the desired number of most significant digits in the product.

Real-time multiplication of digital numbers has been obtained previously as described in the U.S. Pat. No. 3,300,627 of Dean Arden. Real time means that the least significant output digit of the product is produced concurrently with the simultaneous input of the least significant digit of each of the operands. However, the circuit there described must provide as its output all the digits of the product. Since there will be twice as many digits in the product as in the multiplier or multiplicand, which are of equal length, a succession of multiplier (and concurrent multiplicand) digital numbers must be spaced from each other to allow the multiplier circuit to complete the multiplication process before a new multiplier is provided to the circuit. This waiting period slows down the rate at which multiplications may be performed to one-half the rate at which they could be performed if the circuitry could accept numbers for multiplication without requiring that they be spaced by a time equal to their own length.

It is, therefore, an object of this invention to provide multiplication in real time where the number of digits of the product may be less than twice the number of digits in the multiplier or multiplicand. The least significant digit provided by the multiplier is produced at the same time relative to the least significant digit of the operands as in the prior art real time multiplier. In particular, if the product digits desired are equal in number to that of the multiplier or multiplicand, the successive multipliers (and multiplicands) may be introduced into the multiplier adjacent to each other. If more significant product digits are desired, the multiplier (and multiplicand) numbers are spaced by a time corresponding to the number of extra product digits.

A feature of the apparatus employed in the preferred embodiment is that the circuit is iterative; that is, it is constructed by interconnecting a number of substantially identical modules so that a multiplier is obtained by merely using as many modules as the maximum number of digits, binary or any other base, in the operands.

Other and further objects will be explained hereinafter and will be more particularly pointed out in connection with the appended claims in conjunction with the figures:

Figure 1:
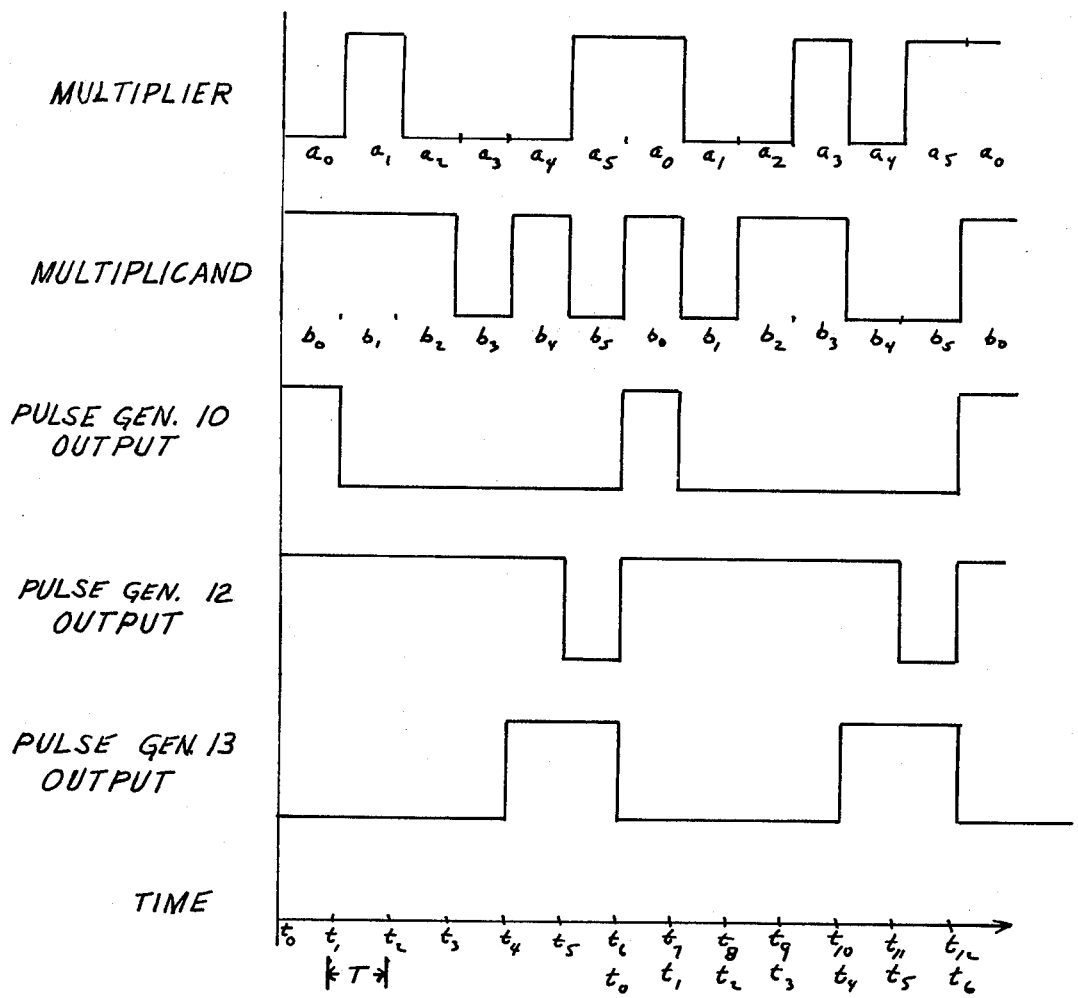
FIG. 1 is a timing diagram of signals applied to the multiplier.

The real-time multiplier of this invention concurrently accepts the serially provided digits in each of the numbers to be multiplied on two separate inputs. The n input digits of the operand are successively multiplied to yield, for example, the n most significant of the 2n product digits. The successive operands are processed one after the other without delay. The multiplier is formed by cascading substantially identical stages, one stage per operand digit.

Specifically, the stages are identical in blocks of two. The difference between the two stages in a block can readily be seen in FIGS. 2 and 3. These differences occur in the timing lines $t_a$, $t_b$, $t_c$ and $t_d$, the input lines A, B, and the output line $c^o$ carrying the output partial products from each of the summers.

The apparatus of the invention produces only the desired most significant digits of the product of the multiplier and multiplicand. For example, for two six digit binary numbers $a_0 a_1 a_2 a_3 a_4 a_5$ and $b_0 b_1 b_2 b_3 b_4 b_5$, where $a_0$ and $b_0$ are the least significant numbers, the product is a twelve digit binary number $c_0 c_1 - - c_5 c_6 - - c_{10} c_{11}$. The least significant product terms, which are not generated by the multiplier because they are suppressed within the multiplier without affecting the generation of desired product terms are $$c_0 = a_0 b_0$$
$$c_1 = a_0 b_1 + a_1 b_0$$
$$c_2 = a_0 b_2 + a_2 b_0 + a_1 b_1$$
$$c_3 = a_0 b_3 + a_3 n_0 + a_1 b_2 + a_2 b_1$$
$$c_4 = a_0 b_4 + a_4 b_0 + a_1 b_3 + a_3 b_1 + a_2 b_2$$
$$c_5 = a_0 b_5 + a_5 b_0 + a_1 b_4 a_4 b_1 + a_2 b_3 + a_3 b_2$$

The most significant digits $c_6 - - - c_{11}$ appear at the output of the multiplier at a time which begins six time intervals (the time interval occupied by the undesired six product digits) from the least significant digit of the numbers being multiplied. Thus for the situation where successive operand sets are being supplied to the multiplier without interruption, the least significant digit of the product of the preceding operands would be produced as an output at the same time as the least significant digit of the next set of operands was being provided as an input. These most significant product digits are:

$$c_6 = a_1 b_5 + a_5 b_1 + a_2 b_4 + a_4 b_2 + a_3 b_3$$
$$c_7 = a_2 b_5 + a_5 b_2 + a_3 b_4 + a_4 b_3$$
$$c_8 = a_3 b_5 + a_5 b_3 + a_4 b_4$$
$$c_9 = a_4 b_5 + a_5 b_4$$
$$c_{10} = a_5 b_5$$
$$c_{11} = \text{carry}$$

It is seen that the product terms $a_i b_j$ of the least significant product digits $c_0, - - -, c_5$ have the property that their subscript sum $i+j < m$ where $m$ is the least significant desired digit of the product. It is also observed that conversely, the most significant product digits $c_6, - - - c_{11}$ have product terms $a_i b_j$ such that $i+j \geq m$. Therefore, as in the preferred embodiment disclosed herein, a multiplier which suppresses the least significant products $c_0, - - - c_{m-1}$ will suppress all product terms $a_i b_j$ where $i+j < m$. In general, for any base, it will be necessary to suppress those digit products which are part of the summation which produce the least significant digit terms of the final product. However, this must be done without interference in the formation of the terms $a_i b_j$ where $i+j \geq m$. Note that $0 < m \leq 2n-1$ where n is the maximum number of digits in the multiplicand $a_0 - - -a_{n-1}$) and is not constrained to $m = n - 1$.

Figure 2A:
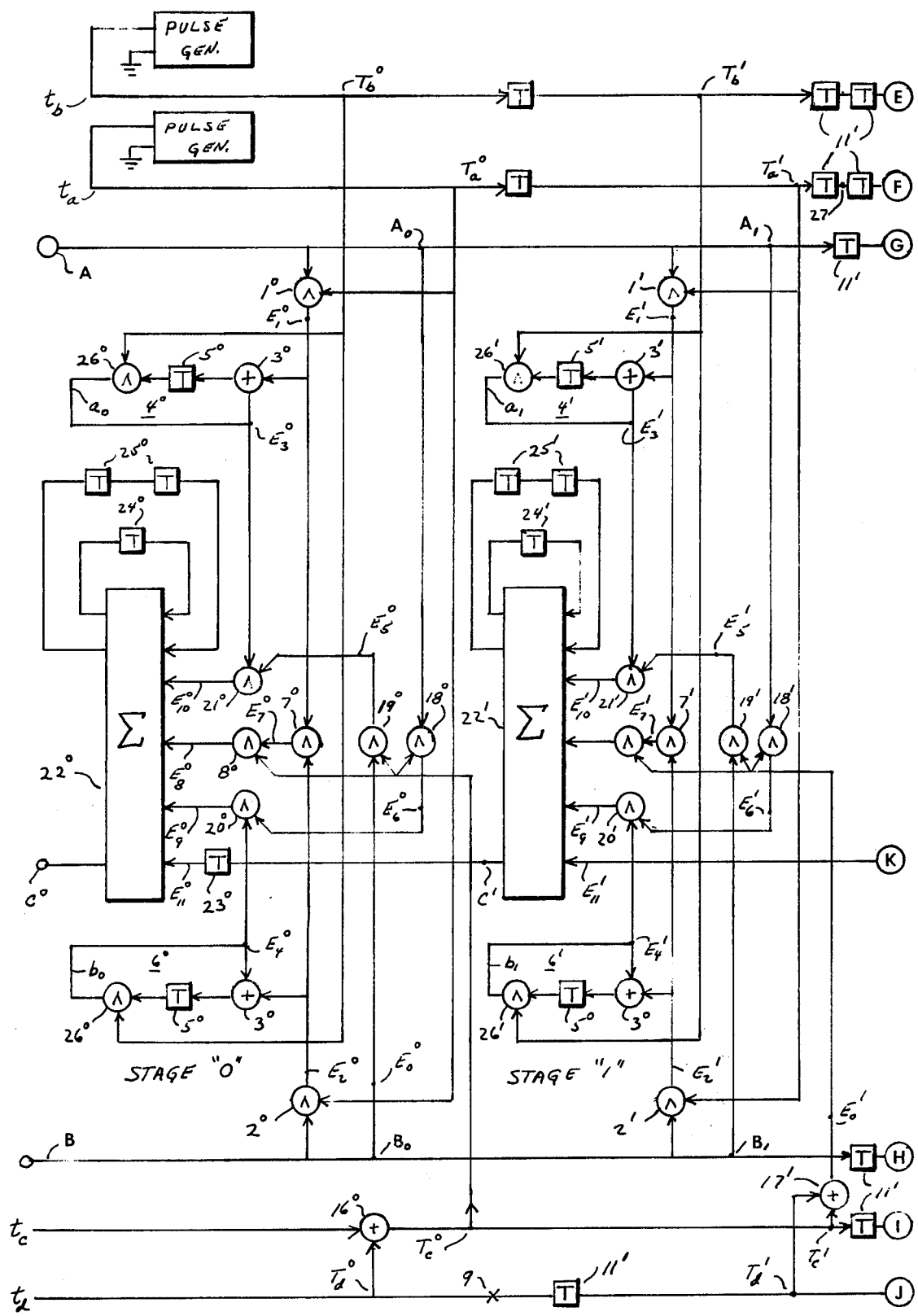
FIG. 2(a) shows the first two stages of a serially connected six-stage digital multiplier.
Figure 2B:
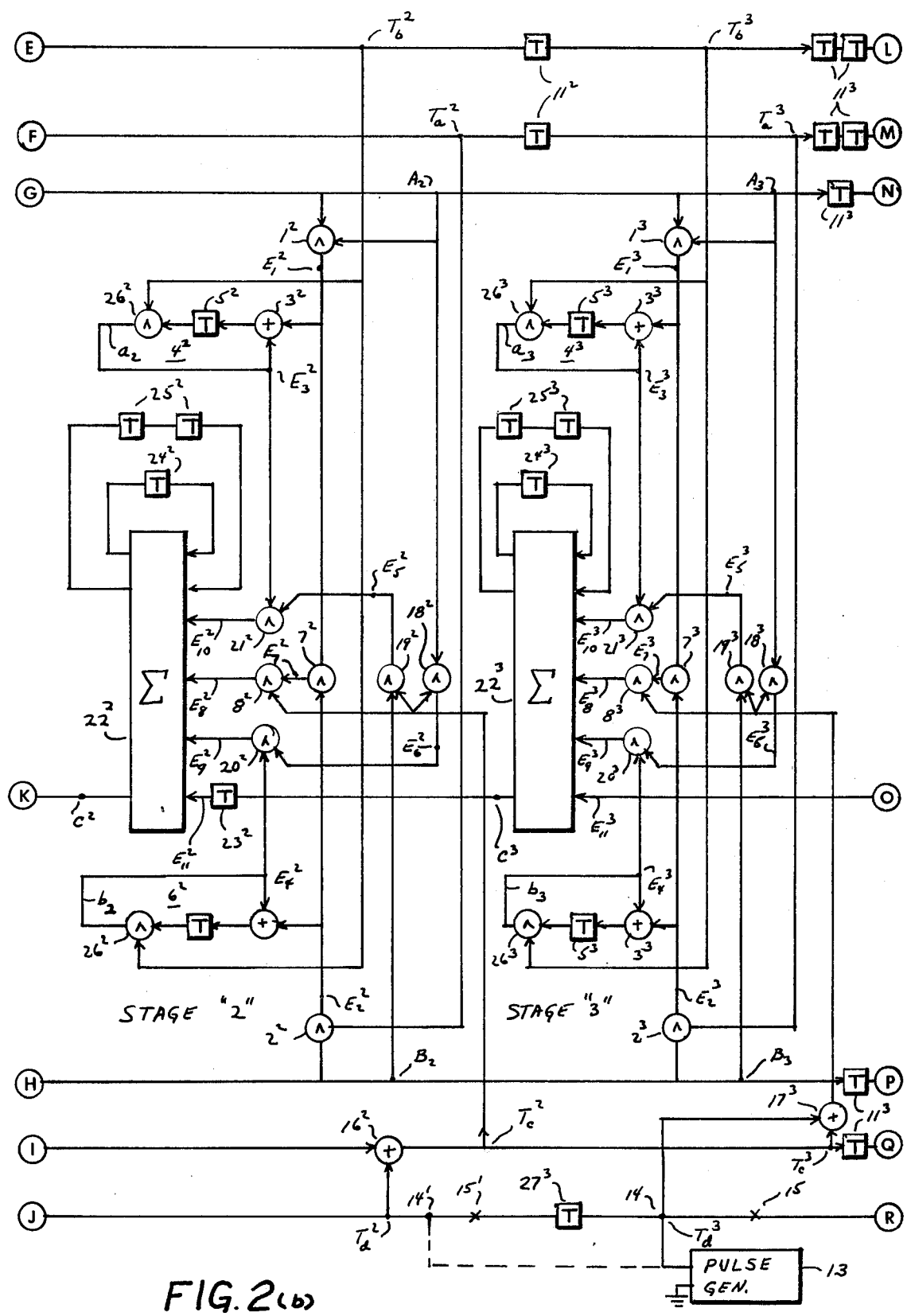
FIG. 2(b) shows the second two stages of a serially connected six-stage digital multiplier.

A preferred embodiment of the invention for performing binary multiplication is shown in FIGS. 2(a), (b) and (c). Each figure contains two stages of the multiplier, each of which is essentially identical. The two stages of each figure constitute an iterative circuit which is cascaded to form a multiplier having as many stages as there are digits in each operand. The diagram of FIG. 1 shows the timing of the operand signals and the control pulses applied to the multiplier for the situation where the operands are considered to have six digits and where the product produced by the multiplier also has six digits.

Timing

For the purpose of illustrating the invention, the multiplier and multiplicand are each six binary digit words $a_0a_1- - -a_5$, $b_0b_1- - -b_5$, respectively. The time intervals during which these digits occur are $t_0t_1- - -t_5$. A pulse on line $t_a$ from pulse generator 10 causes the line to become high occurs during the time interval $t_0$. This pulse travels down line $t_a$ where it becomes available to the multiplier stages 0 through 5 at a time determined by the number of time delay elements 11, each of which delays the pulse by T units of time. The time duration of each pulse interval is also T.

At and during time interval $t_5$ pulse generator 12 causes the usually high level on line $t_b$ to become low. This pulse also travels down line $t_b$ to multiplier stages 0 through 5 and is delayed by delay elements 11 so that it is applied to multiplier stages 0 through 5 at times determined by the number of delay elements 11 between pulse generator 12 and a particular stage.

The voltage level on line $t_d$ is normally in the low state and is caused to become high by a pulse from pulse generator 13. This pulse is a double length pulse in that it has a duration of two time intervals, i.e., 2T. For an even-number of stages, as in the embodiment herein presented, the line $t_d$ is severed before stage $(n/2)$, stage 3 of FIG. 2(b), where n is the number of stages, in this case six $(n=6)$. Note that the stages are numbered 0 through $n-1$. Also the double-length pulse is caused to occur when the digit $a_{(n/2)}(a_3)$, [also $b_{(n/2)}$, $(b_3)$ arrives to be stored in stage $n/2$ (stage 3), i.e., when it arrives at point $A_3$ [$B_3$]. Therefore, for the case of six stages, the pulse from pulse generator 13 occurs during time intervals $t_4$, $t_5$ and pulse generator 13 is connected at terminal 14 and line $t_d$ is severed, as represented by the X at point 15 between stages 3 and 4.

For an odd number of stages the line $t_d$ is cut at stage $(n-1)/2$, and the pulse from generator 13 begins at the time interval when digit $a_{(n+1)/2}$ arrives to be stored in stage $(n+1)/2$. For example, for the case where $n=5$, the cut at pont 15' is made between stages 2 and 3, the pulse from generator 13 will begin at time $t_4$, and generator 13 is connected to line $t_d$ at point 14'. (Of course, the last stage 5 would not be needed in this case.)

In the particular case where the product has the same number of digits as each of the operands the line $t_d$ is cut between the first and second stages (between points $T_d^0$ and $T_d^1$ in FIG. 2(a)). This cut, represented by the X at point 9, prevents the formation of undesired terms $a_ob_r$ and $b_oa_r$ where $0 < r < m-1$ which would not otherwise be properly inhibited by the pulse on line $t_d$.

The pulse signals which occur on line $t_c$ result from its connection through OR circuits 16 to line $t_d$. The pulses on lines $t_d$ and $t_c$ reach a particular stage through OR circuit 17 or through the connection to line $t_c$ as at $T_c^2$ and $T_c^4$.

The operand signals and control signals existing in each stage of the multiplier for several cycles of operation are shown in the following Tables O-V, each table corresponding to a stage 0–5 of FIGS. 2(a), (b) and (c). These tables completely describe for each interval of time the input signals, the output signals and the signals contained within the multiplier. Starting at time $t=t_o$, it is possible to refer to the table for each stage and determine the signals contained therein at any time interval.

The multiplier and multiplicand each have six binary digits which occur during six intervals of time, i.e., during $t_0, t_1, - - - t_5$. This constitutes a cycle. The cycle is repeated every six intervals of time, $t_6- - -t_{11}$, $t_{12}- - -t_{17}$, etc. during which intervals new operands are provided as inputs. The operands of one cycle have their product occur during the next cycle at the output $c^0$ of stage O for the case being considered where $n(n = 6)$ significant product digits are desired. The control signals which are provided as gating signals are represented as a 1 to indicate a high state, a 0 indicating a low state. The AND gates of FIG. 2 are considered to pass a signal $a$ or $b$ applied ot one input when its other input is also high.

Figure 2C:
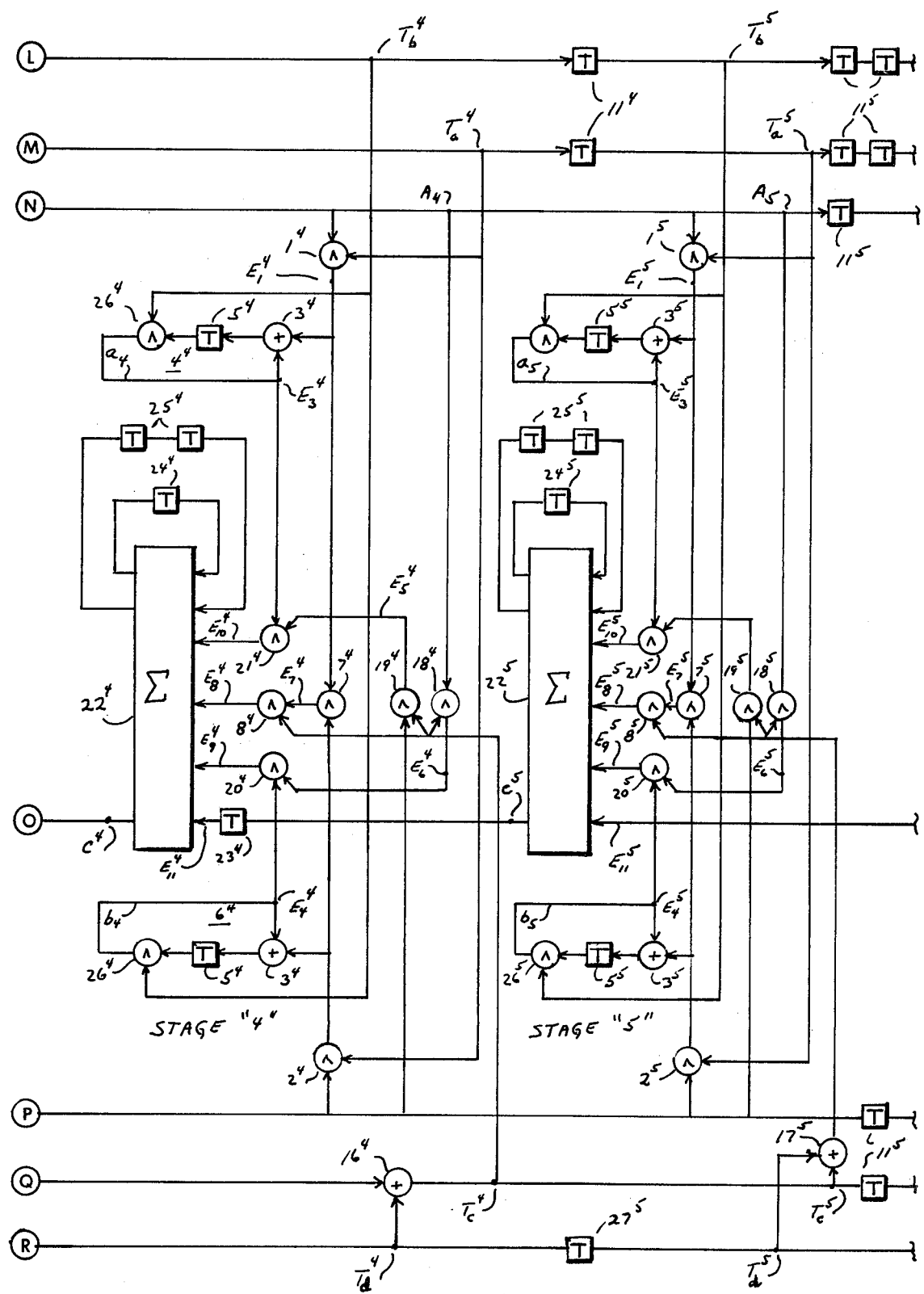
FIG. 2(c) shows the third two stages of a serially connected six-stage digital multiplier.

Although it is believed that the operation of the multiplier of FIG. 2 is apparent from a consideration of Tables 0-5 in conjunction with FIG. 2, a brief description of the operation of the multiplier is presented to assist in an understanding of the invention.

It is assumed that prior to time $t_o$ the multiplier circuit of FIG. 2 has not been provided with operand signals for a time sufficient to have cleared all operand binary digits from the multiplier circuitry. In other words, no multiplication has occured in the previous cycle because of the absence of operands, hence the multiplier is clear of stored digits. As will be seen, this assumption is made only to simplify the presentation of the manner of operation of the multiplier and that multiplication is not affected by the simultaneous presence in the multiplier of digits from successive operands as represented by $t_6$ to $t_{11}$, and $t_{12}$ to $t_{19}$, etc.

At time $t_o$, the least significant binary digits $a_o$, $b_o$ of the operands are applied on lines A and B, respectively. As seen by examination of FIG. 1, pulse generators 10, 12 provide a high level output at time $t_o$ and pulse generator 13 provides a low level output. Reference to the Table for Stage O, discloses that these inputs result in $A^0=a_0$, $B^0=b_0$, $T_a^0=1$, $T_b^0=1$, $T_c^0=0$, $T_d^0=0$ where the superscript O of the letter T refers to the terminals at stage O and the subscripts refer to the lines on which the terminals are located. For these signal inputs to stage O, and gates $1^0$, $2^0$ are provided with time coincident pulses $a_o$ and $T_a^0$, $b_o$ and $T_a^0$, respectively, to provide at their outputs $E_1^0$, $E_2^0$ the signals $a_o$ and $b_o$, respectively. This signal condition at $t=t_o$ is presented in the table for stage O as $E_1^0=a_0$ and $E_2^0=b_o$. Signal $E_1^0$ is provided as an input to OR gate $3^0$ which is an entrance point to recirculating loop 4. Since $E_1^0=a_0$ at $t=t_o$, and is zero at all other times during the cycle, $a_o$ will be introduced into the loop at $t=t_o$ and continue to recirculate until interrupted by a low-level input from $T_b^0$ at time $t_5$ applied to AND gate $26^0$. Thus signal $E_3^0$ is zero at time $t_5$ and also at $t_0$ since time delay element $5^0$ of loop $4^0$ introduces a delay of one pulse duration T. Signal $E_4^0$ in loop $6^0$ is obtained in the same manner except that its source is $E_2^0=b_o$ and therefore it stores the signal $b_0$ during times $t_1- - -t_4$, wherein $E_4^0=b_o$ during time intervals $t_1- - -t_4$. Signals $E_1^0$ and $E_2^0$ also are presented as inputs to AND gate $7^0$ whose output is $a_ob_o$ at time $t_o$ and zero at all other times since $E_1^0$ and $E_2^0$ are then zero. The output $a_ob_o$ is pesented as an input to AND gate $8^0$ whose other input is signal $E_o^0$ obtained from OR gate $16^0$ whose inputs are $T_c^o$ and $T_d^o$. Since line $t_d$ is severed at point 9 in this embodiment, where the number of digits in the product is equal to that in each of the operands, there are never any signals applied to lines $t_c$ and $t_d$ at points $T_c^0$ and $T_d^0$. Therefore all AND gates to which $E_o^0$ is applied as one input produce a zero output regardless of its other input.

Therefore, AND gates $18^0$, $19^0$ to which $a_o b_o$ are applied, respectively, produce zero outputs to AND gates $20^0$, $21^0$. Then the only possible input to summing circuit $22^0$ is the signal $E_{11}^0$, which is the signal $C^1$, received from the summer $22^1$ of Stage 1 after it has been delayed by delay unit $23^0$.

The delay units $24^0$, $25^0$ are connected to the carry outputs of the summing circuit $21^0$ during the time the subsequent digits are applied to the summing circuit. The more significant carry digit has been delayed by two units of time, 2T, by delay elements $25^0$ while the less significant carry digit has been delayed by one unit of time, T, by delay element $24^0$. The necessity for providing carry digits is well understood by those skilled in the art. For example, reference may be made to page 209 of the book, Arithmetic Operation in Digital Computers, R. K. Richards, Von Nostrand Co., 1955, for a description of a multiple-input adder suitable for use in this invention.

No other stage of the remaining stages has any operand signal contained within it since they were assumed to be clear at time $t = t_o$ and therefore these stages may be disregarded at time $t = t_o$.

Time $t = t_1$

At time $t = t_1$ stages 0 and 1 have operand signals $a_1$, $b_1$ at points $A^o$, $A^1$, and $B^o$, $B^1$, respectively. The pulse on line $t_a$ has progressed to point $T_a^1$ so that AND gates $1^1$, $2^1$ of stage 1 is gated on to store $a_1$, $b_1$ in loops $4^1$ and $6^1$, respectively, as signals $E_3^1$, $E_4^1$. Although lines $t_c$ and $t_d$ are connected to stage 1 through gate $17'$, the gate $17'$ output $E_o^1$ is low since a pulse is not produced by pulse generator 13 until time $t=t_4$. Therefore, at $t=t_1$, stage 1 merely stores $a_1$ and $b_1$ in loops $4^1$, $6^1$, respectively.

Stage 0 is unaffected at $t=t_1$ by gates $1^o$ and $2^o$ since $T_a^o$ is low when $A^o=a_1$, $B^o=b_1$. This condition exists for all other values of $a$ and $b$ in the cycle so that signals $a_o$, $b_o$ stored in loops $4^o$, $6^o$ remain unaffected by subsequent signals on lines A and B until the next $T_a^o$ pulse at time $t=t_6$ (which corresponds to $t=t_o$ of the next cycle) concurrent with the new $a_o$, $b_o$, of the next operands supplied at that time.

Time $t=t_2$

At time $t=t_2$, the pulse on line $t_a$ has advanced to point 27 and has not yet reached point $T_a^2$ so that no operand digit is supplied to stage 2 through gates $1^2$, $2^2$. Stages 0 and 1 are also not producing any outputs at $c^o$ and $c^1$ since $E_o^o$ and $E_o^1$ are still at a low level.

Time $t=t_3$

At time $t=t_3$, the pulse on line $t_a$ has reached point $T_a^2$, so that the operand signals $a_2$, $b_2$ then appearing at points $A^2$, $B^2$ respectively are stored in Stage 2 through gates $1^2$, $2^2$. Pulse generator 13 has not yet produced a pulse so that stages 2, 1, and 0 are producing no outputs.

Time $t=t_4$

At time $t=t_4$, the pulse on line $t_a$ has reached points $T_a^3$, $T_b^3$ and operand signals $a_3$, $b_3$ have reached $A^3$, $B^3$, respectively, so that they are stored in stage 3 through gates $1^3$, $2^3$. It is at time $t=t_4$ that pulse generator 13 produces a pulse which is two units, 2T, of time in length. This causes $E_o^3$ to be high thus activating AND gates $8^3$, $18^3$ and $19^3$. The product term $a_3 b_3$ produced in AND gate $7^3$ is passed through gate $8^3$ as the only input to summer $22^3$. The output of summer $22^3$ is therefore $c^3 = a_3 b_3$. All other inputs to summer $22^3$ are zero because there are no carries in delay units $24^3$ or $25^3$, there is no signal $c^4$ yet occurring and the signals $E_g^3$, $E_{10}^3$ are zero since $E_3^3$, $E_4^3$ are zero in loops $4^3$, $6^3$ at time $t=t_4$ (but will be $a_3, b_3$ respectively at $t=t_5$).

Time $t=t_5$

At time $t=t_5$, the pulse on line $t_a$ has not reached $T_a^4$ of stage 4 because of delay unit $11^3$ on line $t_a$ on line so that nothing is stored in stage 4 and $c^4=0$.

In stage 3, the double length pulse at $T_a^3$ is applied through gate $17^3$ to gates $8^3$, $18^3$ and $19^3$ to produce signals $E_8^3=0$, $E_6^3=a_4$ and $E_5^3=b_4$. Signal $E_8^3=0$ since $E_1^3$ and $E_2^3$ are both zero. $E_6^3=a_4$ is applied as one input to gate $20^3$ whose other input is the stored signal $E_4^3=b_3$ thereby producing $E_9^3=a_4 b_3$. Similarly gate $21^3$ produces $E_{10}=a_3 b_4$. The output of summer $22^3$ is then $c^3=a_3 b_4+a_4 b_3$ since there are no other inputs to summer $22^3$. The pulse from generator 13 which begins at $t=t_4$ has passed through delay element $27^3$ at $t=t_5$. This pulse passes through or gate $16^2$ to produce a high output from gate $16^2$ ($E_o^2=1$). This condition, $E_o^2=1$, applied to gates $8^2$, $18^2$ and $19^2$ produces signals $E_8^2=0$, $E_6^2=a_3$ and $E_5^2=b_3$. Signal $E_8^2=0$, since $E_1^2$ and $E_2^2$ are both zero. $E_6^2=a_4$ is applied as one input to gate $20^2$ whose other input is $E_4^2=b_2$, thereby producing $E_9^2=a_4 b_2$. Similarly gate $21^2$ produces $E_{10}^2=a_2 b_4$. The remaining input $E_{11}^2$ to summer $22^2$ is $E_{11}^2 = a_3 b_3$, which was originally produced in stage 3 at time $t=t_4$ but delayed in delay unit $23^2$ until $t=t_4$.

The output $c^2$ from stage 2 at $t=t_4$ is therefore $a_3 b_3 + a_4 b_2 + a_2 b_4$ which is applied as input $E_{11}^1$ of stage 1.

At time $t=t_5$, stage 1 has the first portion of the double length pulse from generator 13 applied through or gate $17^1$ to produce $E_o^1=1$ as an input to gates $8^1$, $18^1$ and $19^1$. The $E_8^1$ output of gate $18^1$ is zero since $E_1^1$ and $E_2^1$ are zero because of the $T_1^1=0$ input to gates $1^1$, $2^1$. The $E_5^1$ output of gate $19^1$ is $b_5$ since $b_5$ is the value at $B_1$. Similarly the output of gate $18'$ is $E_6^1=a_5$ since $A_1=a_5$ with $E_o^1=1$. $E_5^1$ and $E_6^1$ are applied as inputs to gates $21^1$, $20^1$, respectively, where they are gated with $E_3^1=a_1$, $E_4^1=b_1$, respectively, to produce $E_{10}^1=a_1 b_5$ and $E_9^1=a_5 b_1$. Therefore the inputs to summer $21^1$ are $E_8^1=0$ ($E_8^1=0$ because $E_1^1=0$ and $E_2^1=0$), $E_9^1=a_5 b_1$, $E_{10}^1=a_1 b_5$, $E_{11}^1=a_4 b_2+b_4 a_2+a_3 b_3$. The output $c^1$ of summer $22^1$ is thus $a_1 b_5+a_5 b_1+a_2 b_4+a_4 b_4+a_3 b_3$. References to the table associated with stage 1 at time $t=t_4$ expresses this output in a shorthand notion 1-5, 2-4, 3-3 where 1-5 means $a_1 b_5+a_5 b_1$, 2-4 means $a_2 b_4+a_4 b_2$ and 3-3 means $a_3 b_3$. This same shorthand notation is used throughout the tables for all stages.

At time $t=t_5$, stage 0 has a zero output $c^o=0$ because the inputs to summer $22^o$ are all zero. The $a_o$ value for $E_3^0$ is erased from loop $4^o$ by the occurrence of a low level at gate $26^o$ from line $t_b$ at point $T_b^o$. Similarly, $E_4^o=0$ instead of $b_o$. Therefore, $E_9^o$ and $E_{10}^0$ are zero. $E_8^o=0$, $E_5^o=o$ and $E_6^o=0$ since line $t_d$ is cut after stage 0 at point 9 thereby preventing $E_o^o$ from ever becoming high and activating gates $8^o$, $18^o$ and $19^o$. Input $E_{11}^o$ of summing circuit $22^o$ is zero since the value of $c^1$ at time $t_4$ was zero, and $E_{11}^0$ is $C^1$ delayed one digit time interval T by delay unit $23^o$.

Time $t_o = t_6$

At this time the first digits $a_o$, $b_o$ of the next succeeding operands to be multiplied are provided to the input terminals of lines A and B along with a high pulse on line $T_a$. All functions of the components of the stages have been explained at length previously and it is believed that further recitation of the details of which pulses occur on what stages would not serve to further elucidate the invention. Reference to the tables associated with each stage will provide the signal conditions which exist at each stage at time $t = t_6$. Of interest is the observation that at this time interval not only is the first digit of each new number to be multiplied being provided as an input but also $c^6 = a_3b_3 + a_2b_4 + a_4b_2 + a_1b_5 + a_5b_1$, the least significant digit of those digits desired, is being provided by stage 0 as the first digit of the product.

With the input of the second operand digits, it is to be noted that the multiplier is not assumed cleared. Hence, the stage tables indicate the state of the multiplier and its operation upon both the preceeding operand digits and the currently inputted digits.

Times $t = t_7$ through $t = t_{11}$

During these time intervals the other digits $C_7$-$C_{11}$ of the products are being provided by the output of stage 0. For each time interval the signal conditions for each stage may be obtained by referring to the table for that stage. During these time intervals some of the stages, for example, stage 0 at $t = t_{11}$, will produce a digit solely due to the final carry.

TABLE O

Stage O

| | $A^0$ | $B^0$ | $T_a^0$ | $T_b^0$ | $T_c^0$ | $T_d^0$ | $E_o^0$ | $E_1^0$ | $E_2^0$ | $E_3^0$ | $E_4^0$ | $E_5^0$ | $E_6^0$ | $E_7^0$ | $E_8^0$ | $E_9^0$ | $E_{10}^0$ | $E_{11}^0$ | $C^o$ |
|---|---|---|---|---|---|---|---|---|---|---|---|---|---|---|---|---|---|---|---|
| $t_o$ | $a_o$ | $b_o$ | 1 | 1 | 0 | 0 | 0 | $a_o$ | $b_o$ | 0 | 0 | 0 | 0 | $a_ob_o$ | 0 | 0 | 0 | 0 | 0 |
| $t_1$ | $a_1$ | $b_1$ | 0 | 1 | 0 | 0 | 0 | 0 | 0 | $a_o$ | $b_o$ | 0 | 0 | 0 | 0 | 0 | 0 | 0 | 0 |
| $t_2$ | $a_2$ | $b_2$ | 0 | 1 | 0 | 0 | 0 | 0 | 0 | $a_o$ | $b_o$ | 0 | 0 | 0 | 0 | 0 | 0 | 0 | 0 |
| $t_3$ | $a_3$ | $b_3$ | 0 | 1 | 0 | 0 | 0 | 0 | 0 | $a_o$ | $b_o$ | 0 | 0 | 0 | 0 | 0 | 0 | 0 | 0 |
| $t_4$ | $a_4$ | $b_4$ | 0 | 1 | 0 | 0 | 0 | 0 | 0 | $a_o$ | $b_o$ | 0 | 0 | 0 | 0 | 0 | 0 | 0 | 0 |
| $t_5$ | $a_5$ | $b_5$ | 0 | 0 | 0 | 0 | 0 | 0 | 0 | 0 | 0 | 0 | 0 | 0 | 0 | 0 | 0 | 0 | 0 |
| $t_6$ | $a_o$ | $b_o$ | 1 | 1 | 0 | 0 | 0 | $a_o$ | $b_o$ | 0 | 0 | 0 | 0 | $a_ob_o$ | 0 | 0 | 0 | 1-5 2-4 3-3 | $c_6$ |
| $t_7$ | $a_1$ | $b_1$ | 0 | 1 | 0 | 0 | 0 | 0 | 0 | $a_o$ | $b_o$ | 0 | 0 | 0 | 0 | 0 | 0 | 2-5 3-4 3-5 | $c_7$ |
| $t_8$ | $a_2$ | $b_2$ | 0 | 1 | 0 | 0 | 0 | 0 | 0 | $a_o$ | $b_o$ | 0 | 0 | 0 | 0 | 0 | 0 | 4-4 | $c_8$ |
| $t_9$ | $a_3$ | $b_3$ | 0 | 1 | 0 | 0 | 0 | 0 | 0 | $a_o$ | $b_o$ | 0 | 0 | 0 | 0 | 0 | 0 | 5-4 | $c_9$ |
| $t_{10}$ | $a_4$ | $b_4$ | 0 | 1 | 0 | 0 | 0 | 0 | 0 | $a_o$ | $b_o$ | 0 | 0 | 0 | 0 | 0 | 0 | 5-5 | $c_{10}$ |
| $t_{11}$ | $a_5$ | $b_5$ | 0 | 0 | 0 | 0 | 0 | 0 | 0 | 0 | 0 | 0 | 0 | 0 | 0 | 0 | 0 | carry | $c_{11}$ |
| $t_6t_{12}$ | $a_o$ | $b_o$ | 1 | 1 | 0 | 0 | 0 | $a_o$ | $b_o$ | 0 | 0 | 0 | 0 | $a_ob_o$ | 0 | 0 | 0 | 1-5 2-4 3-3 | $c_6$ |
| $t_7t_{13}$ | $a_1$ | $b_1$ | 0 | 1 | 0 | 0 | 0 | 0 | 0 | $a_o$ | $b_o$ | 0 | 0 | 0 | 0 | 0 | 0 | 2-5 3-4 | $c_7$ |

TABLE I

Stage 1

| | $A^1$ | $B^1$ | $T_a^1$ | $T_b^1$ | $T_c^1$ | $T_d^1$ | $E_o^1$ | $E_1^1$ | $E_2^1$ | $E_3^1$ | $E_4^1$ | $E_5^1$ | $E_6^1$ | $E_7^1$ | $E_8^1$ | $E_9^1$ | $E_{10}^1$ | $E_{11}^1$ | $C^1$ |
|---|---|---|---|---|---|---|---|---|---|---|---|---|---|---|---|---|---|---|---|
| $t_o$ | $a_o$ | $d_o$ | 0 | 0 | 0 | 1 | 1 | 0 | 0 | 0 | 0 | $a_o$ | $b_o$ | 0 | 0 | 0 | 0 | 0 | 0 |
| $t_1$ | $a_1$ | $b_1$ | 1 | 1 | 0 | 0 | 0 | $a_1$ | $b_1$ | 0 | 0 | 0 | 0 | $a_1b_1$ | 0 | 0 | 0 | 0 | 0 |
| $t_2$ | $a_2$ | $b_2$ | 0 | 1 | 0 | 0 | 0 | 0 | 0 | $a_1$ | $b_1$ | 0 | 0 | 0 | 0 | 0 | 0 | 0 | 0 |
| $t_3$ | $a_3$ | $b_3$ | 0 | 1 | 0 | 0 | 0 | 0 | 0 | $a_1$ | $b_1$ | 0 | 0 | 0 | 0 | 0 | 0 | 0 | 0 |
| $t_4$ | $a_4$ | $b_4$ | 0 | 1 | 0 | 0 | 0 | 0 | 0 | $a_1$ | $b_1$ | 0 | 0 | 0 | 0 | 0 | 0 | 0 | 0 |
| $t_5$ | $a_5$ | $b_5$ | 0 | 1 | 0 | 1 | 1 | 0 | 0 | $a_1$ | $b_1$ | $b_5$ | $a_5$ | 0 | 0 | $a_5b_1$ | $a_5b_5$ | 2-4 3-3 2-5 | 1-5, 2-4, 3-3 |
| $t_6$ | $a_o$ | $b_o$ | 0 | 0 | 0 | 1 | 1 | 0 | 0 | 0 | 0 | $b_o$ | $a_o$ | 0 | 0 | 0 | 0 | 3-4 3-5 | 2-5, 3-4 |
| $t_7$ | $a_1$ | $b_1$ | 1 | 1 | 0 | 0 | 0 | $a_1$ | $b_1$ | 0 | 0 | 0 | 0 | $a_1b_1$ | 0 | 0 | 0 | 4-4 | 3-5, 4-4 |
| $t_8$ | $a_2$ | $b_2$ | 0 | 1 | 0 | 0 | 0 | 0 | 0 | $a_1$ | $b_1$ | 0 | 0 | 0 | 0 | 0 | 0 | 5-4 | 5-4 |
| $t_9$ | $a_3$ | $b_3$ | 0 | 1 | 0 | 0 | 0 | 0 | 0 | $a_1$ | $b_1$ | 0 | 0 | 0 | 0 | 0 | 0 | 5-5 | 5-5 |
| $t_{10}$ | $a_4$ | $b_4$ | 0 | 1 | 0 | 0 | 0 | 0 | 0 | $a_1$ | $b_1$ | 0 | 0 | 0 | 0 | 0 | 0 | carry | carry |
| $t_{11}$ | $a_5$ | $b_5$ | 0 | 1 | 0 | 1 | 1 | 0 | 0 | $a_1$ | $b_1$ | $b_5$ | $a_5$ | 0 | 0 | $a_5b_1$ | $a_1b_5$ | 2-4 3-3 2-5 | 1-5, 2-4, 3-3 |
| $t_6t_{12}$ | $a_o$ | $b_o$ | 0 | 0 | 0 | 1 | 1 | 0 | 0 | 0 | 0 | $b_o$ | $a_o$ | 0 | 0 | 0 | 0 | 3-4 3-5 | 2-5, 3-4 3-5, 4-4 |
| $t_7t_{13}$ | $a_1$ | $b_1$ | 1 | 1 | 0 | 0 | 0 | $a_1$ | $b_1$ | 0 | 0 | 0 | 0 | $a_1b_1$ | 0 | 0 | 0 | 4-4 | |

TABLE II

Stage 2

| | $A^2$ | $B^2$ | $T_a^2$ | $T_b^2$ | $T_c^2$ | $T_d^2$ | $E_o^2$ | $E_1^2$ | $E_2^2$ | $E_3^2$ | $E_4^2$ | $E_5^2$ | $E_6^2$ | $E_7^2$ | $E_8^2$ | $E_9^2$ | $E_{10}^2$ | $E_{11}^2$ | $C^2$ |
|---|---|---|---|---|---|---|---|---|---|---|---|---|---|---|---|---|---|---|---|
| $t_0$ | 0 | 0 | 0 | 1 | 1 | 1 | 1 | 0 | 0 | 0 | 0 | 0 | 0 | 0 | 0 | 0 | 0 | 0 | 0 |
| $t_1$ | $a_0$ | $b_0$ | 0 | 1 | 0 | 0 | 0 | 0 | 0 | 0 | 0 | 0 | 0 | 0 | 0 | 0 | 0 | 0 | 0 |
| $t_2$ | $a_1$ | $b_1$ | 0 | 0 | 0 | 0 | 0 | 0 | 0 | 0 | 0 | 0 | 0 | 0 | 0 | 0 | 0 | 0 | 0 |
| $t_3$ | $a_2$ | $b_2$ | 1 | 1 | 0 | 0 | 0 | $a_2$ | $b_2$ | 0 | 0 | 0 | 0 | $a_2b_2$ | 0 | 0 | 0 | 0 | 0 |
| $t_4$ | $a_3$ | $b_3$ | 0 | 1 | 0 | 0 | 0 | 0 | 0 | $a_2$ | $b_2$ | 0 | 0 | 0 | 0 | 0 | 0 | 0 | 0 |
| $t_5$ | $a_4$ | $b_4$ | 0 | 1 | 1 | 1 | 1 | 0 | 0 | $a_2$ | $b_2$ | $b_4$ | $a_4$ | 0 | 0 | $a_4b_2$ | $a_2b_4$ | 3-3 | 2-4, 3-3 |
| $t_6$ | $a_5$ | $b_5$ | 0 | 1 | 1 | 1 | 1 | 0 | 0 | $a_2$ | $b_2$ | $b_5$ | $a_5$ | 0 | 0 | $a_5b_2$ | $a_2b_5$ | 3-4 | 2-5, 3-4 |
| $t_7$ | $a_0$ | $b_0$ | 0 | 1 | 0 | 0 | 0 | 0 | 0 | $a_2$ | $b_2$ | 0 | 0 | 0 | 0 | 0 | 0 | 3-5, 4-4 | 3-5, 4-4 |
| $t_8$ | $a_1$ | $b_1$ | 0 | 0 | 0 | 0 | 0 | 0 | 0 | 0 | 0 | 0 | 0 | 0 | 0 | 0 | 0 | 4-5 | 4-5, |
| $t_9$ | $a_2$ | $b_2$ | 1 | 1 | 0 | 0 | 0 | $a_2$ | $b_2$ | 0 | 0 | 0 | 0 | $a_2b_2$ | 0 | 0 | 0 | 5-5 | 5-5 |

TABLE II-continued

Stage 2

| | $A^2$ | $B^2$ | $T_a^2$ | $T_b^2$ | $T_c^2$ | $T_d^2$ | $E_o^2$ | $E_1^2$ | $E_2^2$ | $E_3^2$ | $E_4^2$ | $E_5^2$ | $E_6^2$ | $E_7^2$ | $E_8^2$ | $E_9^2$ | $E_{10}^2$ | $E_{11}^2$ | $C^2$ |
|---|---|---|---|---|---|---|---|---|---|---|---|---|---|---|---|---|---|---|---|
| $t_{10}$ | $a_3$ | $b_3$ | 0 | 1 | 0 | 0 | 0 | 0 | 0 | $a_2$ | $b_2$ | 0 | 0 | 0 | 0 | 0 | 0 | carry | carry |
| $t_{11}$ | $a_4$ | $b_4$ | 0 | 1 | 1 | 1 | 1 | 0 | 0 | $a_2$ | $b_2$ | $b_4$ | $a_4$ | 0 | 0 | $a_4b_2$ | $a_2b_4$ | 3-3 | 2-4, 3-3 |
| $t_6t_{12}$ | $a_5$ | $b_5$ | 0 | 1 | 1 | 1 | 0 | 0 | 0 | $a_2$ | $b_2$ | $b_5$ | $a_5$ | 0 | 0 | $a_5b_2$ | $a_2b_5$ | 3-4 | 2-5, 3-4 |
| $t_7t_{13}$ | $a_0$ | $b_0$ | 0 | 1 | 0 | 0 | 0 | 0 | 0 | $a_2$ | $b_2$ | 0 | 0 | 0 | 0 | 0 | 0 | 3-5, 4-4 | 3-5, 4-4 |

TABLE III

Stage 3

| | $A^3$ | $B^3$ | $T_a^3$ | $T_b^3$ | $T_c^3$ | $T_d^3$ | $E_o^3$ | $E_1^3$ | $E_2^3$ | $E_3^3$ | $E_4^3$ | $E_5^3$ | $E_6^3$ | $E_7^3$ | $E_8^3$ | $E_9^3$ | $E_{10}^3$ | $E_{11}^3$ | $C^3$ |
|---|---|---|---|---|---|---|---|---|---|---|---|---|---|---|---|---|---|---|---|
| $t_o$ | 0 | 0 | 0 | 1 | 1 | 0 | 1 | 0 | 0 | 0 | 0 | 0 | 0 | 0 | 0 | 0 | 0 | 0 | 0 |
| $t_1$ | $a_o$ | $b_o$ | 0 | 1 | 0 | 0 | 0 | 0 | 0 | 0 | 0 | 0 | 0 | 0 | 0 | 0 | 0 | 0 | 0 |
| $t_2$ | $a_1$ | $b_1$ | 0 | 1 | 0 | 0 | 0 | 0 | 0 | 0 | 0 | 0 | 0 | 0 | 0 | 0 | 0 | 0 | 0 |
| $t_3$ | $a_2$ | $b_2$ | 0 | 0 | 0 | 0 | 0 | 0 | 0 | 0 | 0 | 0 | 0 | 0 | 0 | 0 | 0 | 0 | 0 |
| $t_4$ | $a_3$ | $b_3$ | 1 | 1 | 0 | 1 | 1 | $a_3$ | $b_3$ | 0 | 0 | $b_3$ | $a_3$ | $a_3b_3$ | $a_3b_3$ | 0 | 0 | 0 | 3-3 |
| $t_5$ | $a_4$ | $b_4$ | 0 | 1 | 1 | 1 | 1 | 0 | 0 | $a_3$ | $b_3$ | $b_4$ | $a_4$ | 0 | 0 | $a_4b_3$ | $a_3b_4$ | 0 | 3-4 |
| $t_6$ | $a_5$ | $b_5$ | 0 | 1 | 1 | 0 | 1 | 0 | 0 | $a_3$ | $b_3$ | $b_5$ | $a_5$ | 0 | 0 | $a_5b_3$ | $a_3b_5$ | 4-4 | 3-5, 4-4 |
| $t_7$ | $a_o$ | $b_o$ | 0 | 1 | 0 | 0 | 0 | 0 | 0 | $a_3$ | $b_3$ | 0 | 0 | 0 | 0 | 0 | 0 | 4-5 | 4-5 |
| $t_8$ | $a_1$ | $b_1$ | 0 | 1 | 0 | 0 | 0 | 0 | 0 | $a_3$ | $b_3$ | 0 | 0 | 0 | 0 | 0 | 0 | 5-5 | 5-5 |
| $t_9$ | $a_2$ | $b_2$ | 0 | 0 | 0 | 0 | 0 | 0 | 0 | 0 | 0 | 0 | 0 | 0 | 0 | 0 | 0 | carry | carry |
| $t_{10}$ | $a_3$ | $b_3$ | 1 | 1 | 0 | 1 | 1 | $a_3$ | $b_3$ | 0 | 0 | $b_3$ | $a_3$ | $a_3b_3$ | $a_3b_3$ | 0 | 0 | 0 | 3-3 |
| $t_{11}$ | $a_4$ | $b_4$ | 0 | 1 | 1 | 1 | 1 | 0 | 0 | $a_3$ | $b_3$ | $b_4$ | $a_4$ | 0 | 0 | $a_4b_3$ | $a_3b_4$ | 0 | 3-4 |
| $t_6t_{12}$ | $a_5$ | $b_5$ | 0 | 1 | 1 | 0 | 1 | 0 | 0 | $a_3$ | $b_3$ | $b_5$ | $a_5$ | 0 | 0 | $a_5b_3$ | $a_3b_5$ | 4-4 | 3-5, 4-4 |
| $t_7t_{13}$ | $a_o$ | $b_o$ | 0 | 1 | 0 | 0 | 0 | 0 | 0 | $a_3$ | $b_3$ | 0 | 0 | 0 | 0 | 0 | 0 | 4-5 | 4-5 |

TABLE IV

Stage 4

| | $A^4$ | $B^4$ | $T_a^4$ | $T_b^4$ | $T_c^4$ | $T_d^4$ | $E_o^4$ | $E_1^4$ | $E_2^4$ | $E_3^4$ | $E_4^4$ | $E_5^4$ | $E_6^4$ | $E_7^4$ | $E_8^4$ | $E_9^4$ | $E_{10}^4$ | $E_{11}^4$ | $C^4$ |
|---|---|---|---|---|---|---|---|---|---|---|---|---|---|---|---|---|---|---|---|
| $t_o$ | 0 | 0 | 1 | 1 | 1 | 0 | 1 | 0 | 0 | 0 | 0 | 0 | 0 | 0 | 0 | 0 | 0 | 0 | 0 |
| $t_1$ | 0 | 0 | 0 | 1 | 1 | 0 | 1 | 0 | 0 | 0 | 0 | 0 | 0 | 0 | 0 | 0 | 0 | 0 | 0 |
| $t_2$ | $a_o$ | $b_o$ | 0 | 1 | 0 | 0 | 0 | 0 | 0 | 0 | 0 | 0 | 0 | 0 | 0 | 0 | 0 | 0 | 0 |
| $t_3$ | $a_1$ | $b_1$ | 0 | 1 | 0 | 0 | 0 | 0 | 0 | 0 | 0 | 0 | 0 | 0 | 0 | 0 | 0 | 0 | 0 |
| $t_4$ | $a_2$ | $b_2$ | 0 | 1 | 0 | 0 | 0 | 0 | 0 | 0 | 0 | 0 | 0 | 0 | 0 | 0 | 0 | 0 | 0 |
| $t_5$ | $a_3$ | $b_3$ | 0 | 0 | 0 | 0 | 0 | 0 | 0 | 0 | 0 | 0 | 0 | 0 | 0 | 0 | 0 | 0 | 0 |
| $t_6$ | $a_4$ | $b_4$ | 1 | 1 | 1 | 0 | 1 | $a_4$ | $b_4$ | 0 | 0 | $b_4$ | $a_4$ | $a_4b_4$ | $a_4b_4$ | 0 | 0 | 0 | 4-4 |
| $t_7$ | $a_5$ | $b_5$ | 0 | 1 | 1 | 0 | 1 | 0 | 0 | $a_4$ | $b_4$ | $b_5$ | $a_5$ | 0 | 0 | $a_5b_4$ | $a_4b_5$ | 0 | 4-5 |
| $t_8$ | $a_o$ | $b_o$ | 0 | 1 | 0 | 0 | 0 | 0 | 0 | $a_4$ | $b_4$ | 0 | 0 | 0 | 0 | 0 | 0 | 5-5 | 5-5 |
| $t_9$ | $a_1$ | $b_1$ | 0 | 1 | 0 | 0 | 0 | 0 | 0 | $a_4$ | $b_4$ | 0 | 0 | 0 | 0 | 0 | 0 | carry | carry |
| $t_{10}$ | $a_2$ | $b_2$ | 0 | 1 | 0 | 0 | 0 | 0 | 0 | $a_4$ | $b_4$ | 0 | 0 | 0 | 0 | 0 | 0 | 0 | 0 |
| $t_{11}$ | $a_3$ | $b_3$ | 0 | 0 | 0 | 0 | 0 | 0 | 0 | 0 | 0 | 0 | 0 | 0 | 0 | 0 | 0 | 0 | 0 |
| $t_6t_{12}$ | $a_4$ | $b_4$ | 1 | 1 | 1 | 0 | 1 | $a_4$ | $b_4$ | 0 | 0 | $b_4$ | $a_4$ | $a_4b_4$ | $a_4b_4$ | 0 | 0 | 0 | 4-4 |
| $t_7t_{13}$ | $a_5$ | $b_5$ | 0 | 1 | 1 | 0 | 1 | 0 | 0 | $a_4$ | $b_4$ | $b_5$ | $a_5$ | 0 | 0 | $a_5b_4$ | $a_4b_5$ | 0 | 4-5 |

TABLE V

Stage 5

| | $A^5$ | $B^5$ | $T_a^5$ | $T_b^5$ | $T_c^5$ | $T_d^5$ | $E_o^5$ | $E_1^5$ | $E_2^5$ | $E_3^5$ | $E_4^5$ | $E_5^5$ | $E_6^5$ | $E_7^5$ | $E_8^5$ | $E_9^5$ | $E_{10}^5$ | $E_{11}^5$ | $C^5$ |
|---|---|---|---|---|---|---|---|---|---|---|---|---|---|---|---|---|---|---|---|
| $t_o$ | 0 | 0 | 0 | 0 | 1 | 0 | 1 | 0 | 0 | 0 | 0 | 0 | 0 | 0 | 0 | 0 | 0 | 0 | 0 |
| $t_1$ | 0 | 0 | 1 | 1 | 1 | 0 | 1 | 0 | 0 | 0 | 0 | 0 | 0 | 0 | 0 | 0 | 0 | 0 | 0 |
| $t_2$ | $a_o$ | $b_o$ | 0 | 1 | 0 | 0 | 0 | 0 | 0 | 0 | 0 | 0 | 0 | 0 | 0 | 0 | 0 | 0 | 0 |
| $t_3$ | $a_1$ | $b_1$ | 0 | 1 | 0 | 0 | 0 | 0 | 0 | 0 | 0 | 0 | 0 | 0 | 0 | 0 | 0 | 0 | 0 |
| $t_4$ | $a_2$ | $b_2$ | 0 | 1 | 0 | 0 | 0 | 0 | 0 | 0 | 0 | 0 | 0 | 0 | 0 | 0 | 0 | 0 | 0 |
| $t_5$ | $a_3$ | $b_3$ | 0 | 1 | 0 | 0 | 0 | 0 | 0 | 0 | 0 | 0 | 0 | 0 | 0 | 0 | 0 | 0 | 0 |
| $t_6$ | $a_4$ | $b_4$ | 0 | 0 | 1 | 0 | 1 | 0 | 0 | 0 | 0 | $b_4$ | $a_4$ | 0 | 0 | 0 | 0 | 0 | 0 |
| $t_7$ | $a_5$ | $b_5$ | 1 | 1 | 1 | 0 | 1 | $a_5$ | $b_5$ | 0 | 0 | $b_5$ | $a_5$ | $a_5b_5$ | $a_5b_5$ | 0 | 0 | 0 | 5-5 |
| $t_8$ | $a_o$ | $b_o$ | 0 | 1 | 0 | 0 | 0 | 0 | 0 | $a_5$ | $b_5$ | 0 | 0 | 0 | 0 | 0 | 0 | 0 | carry |
| $t_9$ | $a_1$ | $b_1$ | 0 | 1 | 0 | 0 | 0 | 0 | 0 | $a_5$ | $b_5$ | 0 | 0 | 0 | 0 | 0 | 0 | 0 | 0 |
| $t_{10}$ | $a_2$ | $b_2$ | 0 | 1 | 0 | 0 | 0 | 0 | 0 | $a_5$ | $b_5$ | 0 | 0 | 0 | 0 | 0 | 0 | 0 | 0 |
| $t_{11}$ | $a_3$ | $b_3$ | 0 | 1 | 0 | 0 | 0 | 0 | 0 | $a_5$ | $b_5$ | 0 | 0 | 0 | 0 | 0 | 0 | 0 | 0 |
| $t_6t_{12}$ | $a_4$ | $b_4$ | 0 | 0 | 1 | 0 | 1 | 0 | 0 | 0 | 0 | $b_4$ | $a_4$ | 0 | 0 | 0 | 0 | 0 | 0 |
| $t_7t_{13}$ | $a_5$ | $b_5$ | 1 | 1 | 1 | 0 | 1 | $a_5$ | $b_5$ | 0 | 0 | $b_5$ | $a_5$ | $a_5b_5$ | $a_5b_5$ | 0 | 0 | 0 | 5-5 |

The invention has been described as one where the number of stages is equal to the number of digits in the multiplicand, multiplier and product. As described thus for this embodiment makes no provision for including carries from less significant digits into the least significant product digit. Hence, if greater accuracy is desired, more of the less significant product digits can be formed and then truncation or round-off performed. This would require a zero binary digit between operands for each such additional product digit. The number of stages in the multiplier circuit would remain unaltered with only a slight modification in lines $t_c$ and $t_d$.

More specifically, if the least significant product digit desired is $c_k$, where $k$ is less than $n$-1, where $n$ is the number of operand digits, the cut 9 of lines $t_c$ and $t_d$ at stage 0 is eliminated. The connection point 14 on line $t_d$ and the time of occurrance of the pulse from pulse generator 13 is determined as follows:

If $a_i$, $b_j$ are the binary digits of the operands stored in a particular stage and when $i+j=k$ for $i=j$, then the cut 15 of line $t_d$ is between stage $k/2$ and $(k/2)+1$ and the pulse from generator 13 occurs when $a_i=a_{(k/2)}$ arrives to be stored in stage $k/2$.

If $i+j=k$ and $i\neq j$, then the cut 15 of line $t_d$ is between stages $(k-1)/2$ and $(k+1)/2$ and the pulse from generator 13 occurs at a time when signal $a_{(k+1)/2}$ arrives to be stored in stage $(k+1)/2$.

For stages after the cut 15, no inhibition occurs because the line $t_c$ will have a high level at all times that operand signals are present in these stages. The cut 15 on line $t_d$ was made for aesthetic reasons since it is seen that the line $t_d$ may remain connected to generator 13 without affecting the operation of stages after the cut 15. An alternative arrangement would be to eliminate and gates 8, 18 and 19 from these stages together with lines $t_o$, $t_d$ and their associated or gates 16, 17. If $k$ is greater than $m-1$, the above algorithm of cut 15, insertion of pulse generator 13 and the time of occurrences of the pulse on line $t_d$ remains unchanged. However, no blanks (or 0's) need be inserted between operand sets.

Figure 3:
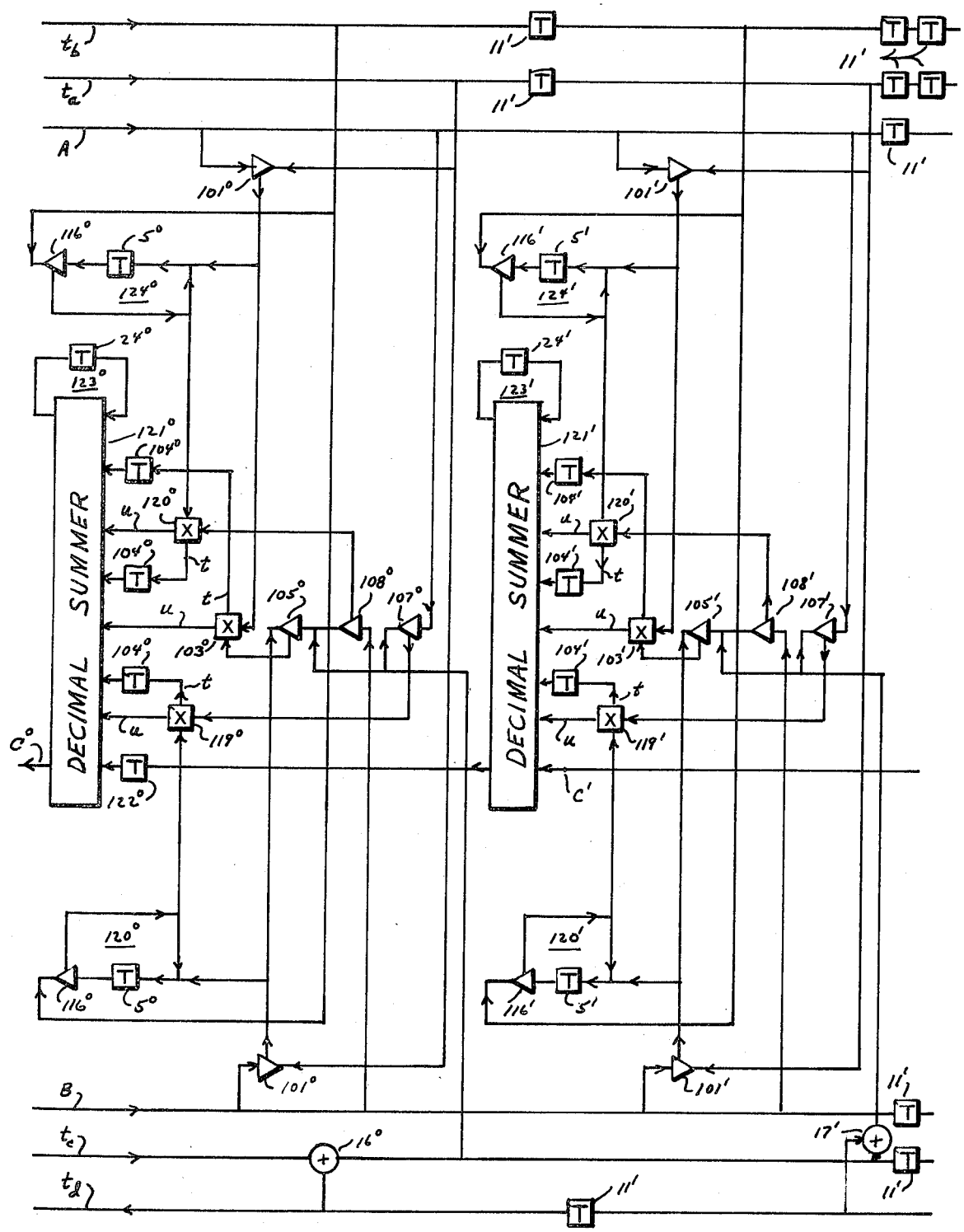
FIG. 3 shows two stages of a decimal multiplier.

While the invention has been described in the form of an embodiment of a binary digit multiplier, decimal and other bases of multiplication may also be employed. A decimal system embodying the principles underlying the invention is shown in FIG. 3. Comparison of FIG. 3 with FIG. 2 discloses that the general arrangement is the same in the two figures particularly with respect to the lines containing delay elements T and their associated signal and pulse sources which are numbered accordingly the same in both figures. The binary summer 22 of FIG. 2 is replaced by the decimal summer 121 of FIG. 3. The function of decimal summer 121 is to sum its decimal inputs to provide a decimal output and a carry in delay loop 123. The carry is applied as an input to summer 121 during the next succeeding decimal digit interval. The inputs to summer 121 are the decimal equivalents of the inputs to the binary summer 22. Each stage has storage loops 124, 120 where a decimal digit $a_m$, $b_m$, $0 \leq m \leq n-1$ is stored, respectively. The digit $a_m$ is introduced into loop 124 through gate 101 which is gated on by the pulse on line $t_a$. The stored digit $a_m$ in loop 124 is removed by the pulse on line $t_b$ becoming low on gate 116. This timing of the pulse on line $t_b$ has been explained in connection with FIG. 2. Gate 101 also provides a signal $b_m$ to gate 105. The pulses from line $t_c$ determine whether $b_m$ will pass through gate 105 in order to be multiplied by decimal multiplier 103 in the same manner as AND gates 7 and 8 function in FIG. 2. Gates 107, 108 provide other $a$ and $b$ decimal digits to decimal multiplier 119, 120 in the same manner as gates 18, 19 provided signals to gates 20, 21 in FIG. 2. The delay unit 122 serves the same function as delay unit 23 of FIG. 2 in delaying the output digit of a preceeding summer.

In the decimal multiplier two outputs are obtained when the product equals ten or greater. The unit term is designated by the letter $u$ at the multiplier output and this output is provided without delay as an input to summer 121. The other multiplier output is the tens term, designated by the letter $t$, which must be delayed by one signal digit time interval in order to cause it to be summed to form the next most significant digit. This delay is produced by delay units 104. Delay units equivalent to units 104 are not to be found in FIG. 2 since the and circuits used for binary multiplication of two binary inputs do not produce a carries.

While there has been described in the preceding specification a preferred embodiment of the invention, further modifications will also occur to those skilled in the art and all are considered to fall within the spirit and scope of the invention as defined in the appended claims.

What is claimed is:

1. A real time multiplier for multiplying digital serial operand electrical signals representing a multiplicand, $a_0 a_1 \cdots a_{n-1}$ and a multiplier $b_0 b_1 \cdots b_{n-1}$ to provide a product $c_k c_{k+1} \cdots c_{2n-1}$, wherein $[0 \leq k \leq 2n-1]$ comprising a plurality of serially connected multiplier stages, a first, second, third, fourth, fifth and sixth electrically conducting lines, means for simultaneously applying each of the multiplicand and multiplier signals serially at a fixed rate in time coincidence to the input terminals of said first and second lines, respectively, with the signals corresponding to the least significant digit $a_o$, $b_o$, being applied first, a plurality of delay elements each having a delay of one digit-time-duration, said first and second lines being connected to corresponding inputs of each multiplier stage, said first and second lines having a delay element in each line between alternate mutiplier stages, the first delay element being in said first and second lines between the connections to the inputs of the second multiplier stage 1 and the third multiplier stage 2, means for applying a first gating pulse to the input terminal of the third line $t_a$ connected to one input of each multiplier stage, said third line $t_a$ having a delay element between corresponding inputs of each multiplier stage and an additional delay element in line $t_a$ between the multiplier stages having said delay elements in said first and second lines, said first gating pulse being in time coincidence with the least signficant digits $a_o$, $b_o$ of the operands at the input to said multiplier, means for applying a second gating pulse to the input terminal of a fourth line $t_b$ connected as a second input to each multiplier stage, said fourth line $t_b$ having a delay element between corresponding inputs of each multiplier stage and an additional delay element in line $t_b$ between the multiplier stages having said delay element in said first and second lines, said second gating pulse being applied to the input of the first multiplier stage at the same time as the most significant operand digits $a_{n-1}$, $b_{n-1}$ are applied on their respective signal lines to the input of the first multiplier stage, means for applying a third gating pulse to a fifth line $t_d$, a plurality of two-input OR gates, the output of each OR gate being connected as an input to each of said multiplier stages, the input of each OR gate being connected to said fifth line at locations such that said third gating pulse on said fifth line is applied as an input to the OR gate connected to the input of stage $n/2$ at a time when operand signal $a_{n/2}$ arrives to be stored in stage $n/2$ for $n$ even, (or stage $(n+1)/2$ and at a time when operand signal $a_{(n+1)/2}$ arrives to be stored in stage $(n+1)/2$ for $n$ odd,) said fifth line $t_d$ containing a means for delay of one pulse interval between the first and second stages and alternate stages following the second stage, the OR gate whose output is connected to the input of the first multiplier stage 0 also being connected to the input of the sixth line, the sixth line being connected as an input to each OR gate connected to the remaining multiplier stages, said sixth line containing a delay element of unit-pulse-length delay after the second multiplier stage 1 and the following alternate multiplier stages, said third gating pulse being of time duration equal to that of two signal digits, means for effecting the storage of each successive digit of the multiplier and multiplicand in each successive serially-connected multiplier stage in response to the first gating pulse on said third line $t_a$ and the multiplicand and multiplier on said first and second lines, respectively, means for effecting the removal by gating from storage of said stored digit in each stage in response to the second gating pulse on line $t_b$, means for summing and providing a carry in the summing means of each stage of those product terms $a_ib_j$ where $i+j=r$ and where $k \leq r \leq 2n-1, r=2n-1$ for the first multiplier stage and increasing by one for each stage until $r=k$ for the last stage, said product terms being provided to the input of said summing means from said storage means and the delayed output of the summing means of the next successive stage, means for delaying the summed product terms, $a_ib_j$ of the output of a summing means of each stage by a delay element between the output of the summing means of a stage and an input of the summing means of a preceding stage, the first multiplier stage producing at its output $c°$ the product terms $c_k, c_{k+1}, \ldots c_{2n-1}$ in serial time sequence.

2. A circuit for use in a real time multiplier circuit comprising:
a first and second multiplier stage,
a first and second AND gate,
a first pulse line $t_a$ connected to each multiplier stage through a first input of said first AND gate (1) and a first input of said second AND gate (2);
a second pulse line $t_b$ connected to each stage through an input of third (26°) and fourth (26') AND gates;
said first and second pulse lines having delay elements (11') between their connections to said first and second stages, said delay element providing a unit of delay equal to the time duration of a digit of the operand;
said first and second pulse lines having two delay elements 11' between said second stage connections and their output terminals which provide two units of delay;
a first A and second B signal line, each connected through a second input of said first (1) and second (2) AND gates, respectively, to each stage, and each line having a delay element (11') between its connection to second stage and its output terminal, said delay element providing a unit of delay;
a third $t_d$ and a fourth $t_c$ pulse line, each connected to the inputs of a first OR gate (16) whose output is connected to said first stage AND gate (8) and to the input of a second OR gate (17);
said second OR gate (17) having its other input connected to said third pulse line at the line output terminal;
said third pulse line $t_d$ having a delay element (11) having one unit of delay between the connection to OR gate (17) and gate (16);
a delay element (11) of one unit of delay having one terminal connected to the second input of the second OR gate (17) and having its other terminal at the output terminal of said fourth pulse line $t_c$;
each multiplier stage comprising:
a summing circuit (22);
a first (4) and second (6) storage loop each comprising a serially connected OR gate (3), a delay element (5) providing one unit of delay, and said third and fourth AND gates (26) respectively;
the output of said first (1) and second (2) AND gates being connected to an input of the OR gates (3) of said first (4) and second (6) storage loops, respectively;
said second pulse line $t_b$ being connected to each stage as an input to the third and fourth AND gate (26) of said first (4) and second (6) storage loops, respectively;
said first (1) and second (2) AND gates also providing the inputs to a fifth AND gate (7) whose output is provided as an input to a sixth AND gate (8);
said first signal line A providing an input to a seventh AND gate (18);
said second signal line B providing an input to a eighth AND gate (19);
the other to each of the sixth (8), seventh (18) and eighth (19) AND gates being connected to said first OR gate (16) output; for the first stage and to the second OR gate (17) for the second stage;
said seventh AND gate (18) output being connected as an input to a ninth AND gate (20) whose output is connected to one of the inputs of said summing circuit (22);
said eighth AND gate (19) output being connected as an input to a tenth AND (21) whose output is connected to one of the inputs of said summing circuit;
said ninth AND gate (20) having its other input connected to the output of the AND gate (26) of the second storage loop (6) and its output connected as an input to the summing circuit (22);
said tenth AND gate (21) having its other input connected to the output of the AND gate (26) of the first storage loop (4) and its output connected as an input to the summing circuit (22);
said summing circuit (22) having a delay element of one unit of delay connected between one of its carry outputs and one of its inputs;
said summing circuit (22) having a delay element of two units of delay connected between one of its carry outputs, the higher order one, and one of its inputs;
a delay element (23) connected between the output of the second stage summing circuit and an input of the first stage summing circuit.

3. A real time decimal multiplier circuit comprising:
a first and second multiplier stage,
a first pulse line $t_a$ connected to each multiplier stage through a first input of first and second gates (101);
a second pulse line $t_b$ connected to each stage through an input of third and fourth gates (116);
said first and second pulse lines have a delay element (11) between the connections to said first and second stages, said delay element providing a unit of delay equal to the time duration of a digit of the operand;
said first and second pulse lines have delay elements 11 between said second stage connections and their output terminals which provide two units of delay;
a first A and second B signal line, each connected through a second input of said first and second gates (101), respectively, to each stage, and each signal line having a delay element (11) between its connection to said second stage and its output terminal, said delay element providing a unit of delay;

a third $t_d$ and fourth $t_c$ pulse line, each connected to the inputs of a first OR gate (16) whose output is connected to said first stage;

a second OR gate (17) having a first input connected to said third pulse line at the line output terminal and a second input connected to said first OR gate (16) output;

said third pulse line $t_d$ having a delay element 11 having one unit of delay between the connection to OR gate (17) and gate (16);

a delay element of one unit of delay having one terminal connected to the second input of the second OR gate (17) and having its other terminal at the output terminal of said fourth pulse line;

each multiplier stage comprising:

a summing circuit (121);

a first (120) and second (124) storage loop each comprising a serially connected delay element (5), providing one unit of delay, and AND gate (116);

the output of said first and second AND gates (101) being connected to an input of the said first (120) and second (124) storage loops, respectively;

said second pulse line $t_b$ being connected to each stage as another input to the third and fourth AND gates (116) of said first (120) and second (124) storage loops, respectively;

said first AND gate (101) also providing the input to a fifth AND gate (105) whose output is provided as an input to a decimal multiplier (103);

said first signal line A providing an input to a sixth AND gate (107);

said second signal line B providing an input to a seventh AND gate (108);

the other input of each of the fifth AND gate (105), the sixth AND gate (107), and the seventh AND gate (108) being connected to the output of said OR gate (16), and the outputs of gates (105), (107) and (108) to decimal multiplier (103), (119) and (120), respectively;

each decimal multiplier having two outputs, a first output providing the unit term of the product output of the multiplier and the second output providing the tens term;

the first output of multiplier (103), (119) and (120) being connected as inputs to decimal summer (121);

the second output of each multiplier (103), (119) and (120) being connected through a time delay element (104) of one unit of delay as an input to decimal summer (121);

said summer (121) having a delay element (24) of one unit of delay connected between the summer carry output and one of the summer inputs;

a delay element (122) having one unit of delay connected between the output of the second stage summer and an input of the first stage summer.

4. A real time multiplier circuit comprising:

a plurality of first and second multiplier stages, a first and second AND gate, a first pulse line $t_a$ connected to each multiplier stage through a first input of said first AND gate (1) and a first input of said second AND gate (2);

a second pulse line $t_b$ connected to each stage through an input of third (26°) and fourth (26') AND gates;

said first and second pulse lines having delay elements (11') between their connections to said first and second stages, said delay element providing a unit of delay equal to the time duration of a digit of the operand;

said first and second pulse lines having two delay elements (11') between said second stage connections and their output terminals which provide two units of delay;

a first A and second B signal line, each connected through a second input of said first (1) and second (2) AND gates, respectively, to each stage, and each line having a delay element (11') between its connection to said second stage and its output terminal, said delay element providing a unit of delay;

a third $t_d$ and fourth $t_c$ pulse line, each connected to the inputs of a first OR gate (16) whose output is connected to said first stage AND gate (8) and to the input of a second OR gate (17);

said second OR gate (17) having its other input connected to said third pulse line at the line output terminal;

said third pulse line $t_d$ having a delay element (11) having one unit of delay between the connection to OR gate (17) and gate (16);

a delay element (11) of one unit of delay having one terminal connected to the second input of the second OR gate (17) and having its other terminal at the output terminal of said fourth pulse line $t_c$;

each multiplier stage comprising:

a summing circuit (22);

a first (4) and second (6) storage loop each comprising a serially connected OR gate (3), a delay element (5) providing one unit of delay, and said third and fourth AND gates, (26), respectively;

the output of said first (1) and second (2) AND gates being connected to an input of the OR gates (3) of said first (4) and second (6) storage loops, respectively;

said second pulse line $t_b$ being connected to each stage as an input to the third and fourth AND gate (26) of said first (4) and second (6) storage loops, respectively;

said first (1) and second (2) AND gates also providing the inputs to a fifth AND gate (7) whose output is provided as an input to a sixth AND gate (8);

said first signal line A providing an input to a seventh AND gate (18);

said second signal line B providing an input to an eighth AND gate (19);

the other input to each of the sixth (8), seventh (18) and eighth (19) AND gates being connected to said first OR gate (16) output, for the first stage and to the second OR gate (17) for the second stage;

said seventh AND gate (18) output being connected as an input to a ninth AND gate (20) whose output is connected to one of the inputs of said summing circuit (22);

said eighth AND gate (19) output being connected as an input to a tenth AND gate (21) whose output is connected to one of the inputs of said summing circuit;

said ninth AND gate (20) having its other input connected to the output of the AND gate (26) of the second storage loop (6) and its output connected as an input to the summing circuit (22);

said tenth AND gate (21) having its other input connected to the output of the AND gate (26) of the first storage loop (4) and its output connected as an input to the summing circuit (22);

said summing circuit (22) having a delay element of one unit of delay connected between one of its carry outputs and one of its inputs;

said summing circuit (22) having a delay element of two units of delay connected between one of its carry outputs, the higher order one, and one of its inputs;

a delay element (23) connected between the output of the second stage summing circuit and an input of the first stage summing circuit;

the output terminals of signal and pulse lines of a second multiplier stage being connected to the input terminals of the corresponding signal and pulse lines of a first multiplier stage circuit to form a cascaded serial connection of first and second stages, means for applying a pulse of one digit-time duration to the input of said first pulse line $t_a$ of the first stage of the cascade at the same time as the first signal digit of an operand number is being applied to the input of signal lines A, B of the first stage of the cascade, means for applying a pulse of one-digit-time duration to the input of second pulse line $t_b$ of the first stage of the cascade at the same time as the last signal digit of an operand number is being applied to the input of signal lines A, B of the first stage of the cascade, means for applying a pulse of two digit-time duration to said third pulse line $t_d$ at stage $(n/2)$ at a time when an operand digit $a_{(9n/2)}$ arrives at stage $(n/2)$ if n is even, otherwise at stage $(n+1)/2$ at a time when operand digit $a_{(n+1)}/2$ arrives at stage $(n + 1)/2$, the first stage being designated by $n=0$, with $n$ increasing by one for each stage of the serial connection of first and second stages;

said third pulse line $t_d$ being electrically open between said first and second stages of the first two stages of said serially connected multiplier.

5. A real time decimal multiplier circuit comprising:

a plurality of first and second multiplier stages, a first pulse line $t_a$ connected to each multiplier stage through a first input of first and second gates (101);

a second pulse line $t_b$ connected to each stage through an input of third and fourth gates (116);

said first and second pulse lines having a delay element (11) between the connections to said first and second stages, said delay element providing a unit of delay equal to the time duration of a digit of the operand;

said first and second pulse lines having delay elements (11) between said second stage connections and their output terminals which provide two units of delay;

a first A and second B signal line, each connected through a second input of said first and second gates (101), respectively, to each stage, and each signal line having a delay element (11) between its connection to said second stage and its output terminal, said delay element providing a unit of delay;

a third $t_d$ and fourth $t_c$ pulse line, each connected to the inputs of a first OR gate (16) whose output is connected to said first stage;

a second OR gate (17) having a first input connected to said third pulse line at the line output terminal and a second input connected to said first OR gate (16) output;

said third pulse line $t_d$ having a delay element 11 having one unit of delay between the connection to OR gate (17) and gate (16);

a delay element of one unit of delay having one terminal connected to the second input of the second OR gate (17) and having its other terminal at the output terminal of said fourth pulse line;

each multiplier stage comprising:

a summing circuit (121);

a first (120) and second (124) storage loop each comprising a serially connected delay element 5, providing one unit of delay, and AND gate (116);

the output of said first and second AND gates (101) being connected to an input of the said first (120) and second (124) storage loops, respectively;

said second pulse line $t_b$ being connected to each stage as another input to the third and fourth AND gates (116) of said first (120) and second (124) storage loops, respectively;

said first AND gate (101) also providing the input to a fifth AND gate (105) whose output is provided as an input to a decimal multiplier (103);

said first signal line A providing an input to a sixth AND gate (107);

said second signal line B providing an input to a seventh AND gate (108);

the other input of each of the fifth AND gate (105), the sixth AND gate (107), and the seventh AND gate (108) being connected to the output of said OR gate (16), and the outputs of gates (105), (107) and (108) to decimal multiplier (103), (119) and (120), respectively;

each decimal multiplier having two outputs, a first output providing the unit term of the product output of the multiplier and the second output providing the tens term;

the first output of multiplier (103, (119) and (120) being connected as inputs to decimal summer (121);

the second output of each multiplier (103), (119) and (120) being connected through a time delay element (104) of one unit of delay as an input to decimal summer (121);

said summer (121) having a delay element (24) of one unit of delay connected between the summer carry output and one of the summer inputs;

a delay element (122) having one unit of delay connected between the output of the second stage summer and an input of the first stage summer;

the output terminals of the signal and pulse lines of the second multiplier stage of each multiplier circuit being connected to the input terminals of the corresponding signal and pulse lines of the first stage of a different multiplier circuit to form a cascaded serial connection of first and second stages;

means for applying a pulse of one digit-time duration to the input of said first pulse line $t_a$ of the first multiplier stage of the cascade at the same time as the first signal digit of an operand number is being applied to the signal lines A, B, of the first multiplier stage of the cascade, means for applying a pulse of one-digit-time duration to the input of second pulse line $t_b$ at the same time as the last signal digit of an operand number if being applied to the input of signal lines A, B, of the first multiplier stage of the cascade;

means for applying a pulse of two digit-time duration to said third pulse line $t_d$ at stage $(n/2)$ at a time when an operand digit $a_{(n/2)}$ arrives at stage $(n/2)$ if $n$ is even, otherwise at stage $(n +1)/2$ at a time when operand digit $a_{(n+1)/2}$ arrives at a stage $(n +1)/2$. the first stage being designated by $n=0$, with $n$ increasing by one for each stage of the serial connection of first and second stages;

said third pulse line $t_d$ being electrically open between said first and second stages of the first two stages of said serially connected multiplier.

* * * * *